Patented Dec. 12, 1922.

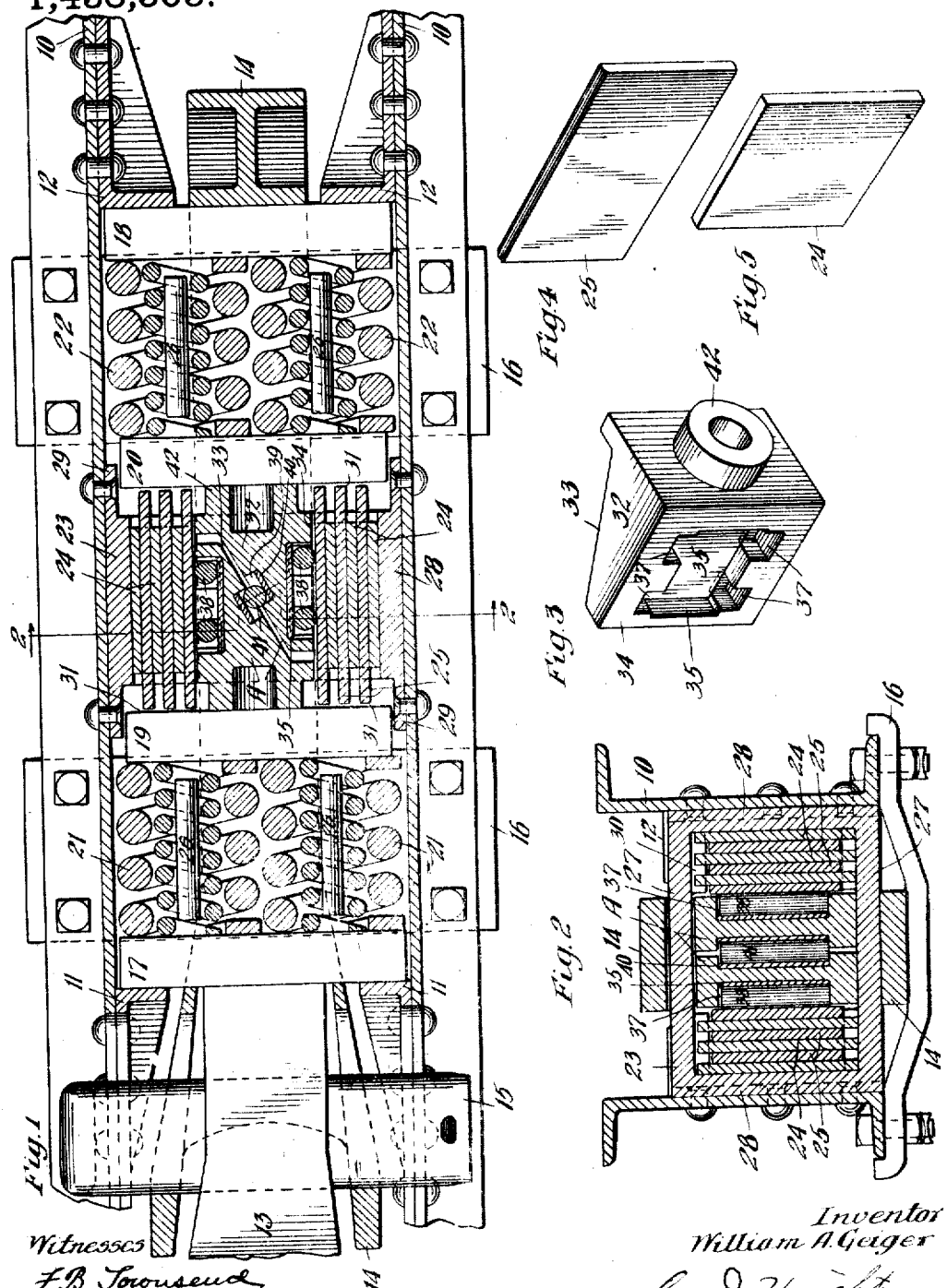

1,438,303

UNITED STATES PATENT OFFICE.

WILLIAM A. GEIGER, OF CHICAGO, ILLINOIS, ASSIGNOR TO WILLIAM H. MINER, OF CHAZY, NEW YORK.

FRICTION SHOCK-ABSORBING MECHANISM.

Application filed January 14, 1921. Serial No. 437,244.

*To all whom it may concern:*

Be it known that I, WILLIAM A. GEIGER, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a high capacity friction shock absorbing mechanism especially adapted for railway draft riggings and wherein is obtained a graduated spring and friction action combined with easy and certain release.

In the drawing forming a part of this specification, Figure 1 is a horizontal, longitudinal, sectional view of a portion of a railway draft rigging showing my improvements in connection therewith. Figure 2 is a vertical, transverse, sectional view taken substantially on the line 2—2 of Fig. 1. Figure 3 is a perspective view of one of the wedge elements. And Figures 4 and 5 are perspective views of one of the movable and one of the stationary friction plates, respectively.

In said drawing, 10—10 denote channel draft sills of a railway car to the inner faces of which are secured front stop lugs 11 and rear stop lugs 12. A portion of a drawbar is indicated at 13, the same being operatively associated with the shock absorbing mechanism proper by a hooded cast yoke 14 and coupler key 15. The yoke and movable parts within the same are supported in operative position by a pair of detachable saddle plates 16—16.

In carrying out my invention, I employ, broadly, front and rear main followers 17 and 18; front and rear intermediate followers 19 and 20; twin arranged front springs 21; twin arranged rear springs 22; a stationary casing 23; a wedging device designated generally by the reference character A; a series of relatively stationary friction plates 24; and a series of relatively movable friction plates 25.

The end main followers 17 and 18 engage and cooperate with the stop lugs in the usual manner. The intermediate followers 19 and 20 do not engage any stop lugs, and engage the end walls of the casing 23 only when the springs 21 or 22 are compressed to an abnormal degree, as will be evident from an inspection of Figure 1. The springs 21 and 22 are interposed between the respective pairs of followers 17 and 19, and 20 and 18. Preferably means for limiting the compression of the springs are employed, the same taking the form of columns or bars 26—26 disposed within the various springs, said columns being of a length corresponding to the lengths of the springs when the latter are closed.

The casing 23 is of hollow rectangular box-like form as best illustrated in Figure 2, the same having top and bottom walls 27—27 and side walls 28—28. The latter are extended at their ends so as to provide flanges 29—29 whereby the casing may be riveted or otherwise rigidly and permanently secured to the draft sills at the center of the mechanism. On opposite sides of the center, the casing 23 is transversely grooved or slotted as indicated at 30—30 so as to provide recesses into which the relatively wide stationary friction plates 24 may be seated and held against longitudinal movement although free to respond to lateral or transverse pressure. The movable friction plates 25 are alternated or intercalated with the stationary plates 24, said movable plates being longer than the dimension of the casing 23 parallel to the center line of the mechanism. Said plates 25 are of a length slightly less than the normal distance between the intermediate followers 19 and 20 so as to leave slight spaces as indicated at 31—31 between the said plates and the followers. This spacing is left in order to permit the wedging device to come into full play by preventing actual contact of the plates with both of the intermediate followers 19 and 20 during the compression of the mechanism.

The wedging device A consists of two units of like form but oppositely disposed. Each of said units includes a wedge-shaped block 32 having a pair of converging faces 33 and 34, the latter extending parallel to the center line and the former extending at an angle thereto. On the side corresponding to the face 34, each block 32 is recessed as indicated at 35 in the bottom of which is disposed a wear plate 36 preferably of cast hardened steel or other suitable material adapted to withstand heavy pressure without deformation. At the sides of each recess 35, transversely extending grooves 37—37 are provided, arranged in pairs, the same being adapted to accommodate the ends of anti-friction rollers 38—38. The width of said grooves 37 taken transversely of the anti-friction rollers is greater than the diameters of the rollers in order to permit the latter free rolling movement while at the same time limiting the amount of such movement. On the side corresponding to the face 33, the block 32 is recessed as indicated at 39, in which is also seated another narrower wear plate 40 to act as a bearing surface of the anti-friction roller 41 which is common to the two units. The recesses 39 are sufficiently wide to permit free rolling movement of the roller 41. At its end, each block 33 is preferably provided with an annular boss 42 adapted to engage and receive pressure from the corresponding intermediate follower 19 or 20. When the wedging device is assembled with the other parts of the friction mechanism proper, the over-all length in full released condition of the parts will be slightly greater than the length of the plates 25 so that, as pressure is applied to the wedging device, the two units may move relatively to each other the small amount necessary to set up the expansion of the wedging device and to create the necessary lateral or transverse pressure prior to either follower 19 or 20 engaging the ends of the movable plates 25.

In operation, assuming an inward or buffing movement of the drawbar, the front main follower 17 will be forced rearwardly. As the follower 17 moves rearwardly, it is afforded a yielding resistance by the front springs 21 and an initial wedging action will be set up, due to the resistance afforded the follower 20 by the springs 22. As the inward movement of the follower 17 continues, and as the spring resistance rises, movement of the follower 19 will commence until it picks up the plates 25 and thereafter the resistance will be gradually increased, due to the increasing resistance afforded by the rear springs 22. During this action it will be observed that the wedging effect produced on the intercalated friction plates will rise in accordance with the compression of the rear spring. In release, it is evident that the front springs 21 are free to expand, thereby relieving pressure on the front end of the wedging device. The wedging device being of truly anti-friction character both with respect to the units composing it and with respect to the device as an entirety, in its engagement with the innermost pair of movable plates 25, will readily collapse and thereby permit the rear springs 22 to expand and force the wedging device and the movable plates back to their normal position, in which at least one of the intermediate followers will be spaced from the adjacent ends of the plates. It is believed that the action under draft will be understood without further detailed explanation, inasmuch as the same sequence of operations will occur although in the reverse direction.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism for railway draft rigging having draft sills, the combination with tandem arranged springs and followers; of a friction device interposed between the intermediate followers, said friction device including, a casing rigid with said sills, a plurality of rigid friction plates retained by said casing against longitudinal movement relative to the sills, a plurality of longitudinally movable friction plates intercalated with said stationary plates and adapted to be engaged and actuated by said intermediate followers, and a wedging device interposed between said intermediate followers operable in either direction to increase the pressure on said plates upon actuation of said intermediate followers.

2. In a railway draft rigging, the combination with draft sills having front and rear sets of stop lugs; of front and rear main followers; front and rear spring units on the inner sides of said followers respectively; a centrally disposed casing rigidly secured to said sills; a plurality of rigid friction plates retained by said casing against longitudinal movement relative to the sills; a plurality of longitudinally movable friction plates alternated with said rigid plates and of greater length; a pair of intermediate followers, one on each side of said casing and each adapted to engage the inner end of one of said spring units; and a wedging device interposed between said intermediate followers, operable in either direction to increase the pressure on said plates upon actuation of said intermediate followers, said rigid and movable plates being arranged in two groups, one on either side of the center line of the mechanism and said wedging device being interposed between the two groups.

3. In a friction shock absorbing mechanism for railway draft rigging having draft sills, the combination with tandem arranged springs and followers; of a friction device interposed between the intermediate followers, said friction device including a casing rigid with said sills, a plurality of rigid friction plates retained by said casing against longitudinal movement relative to the sills, a plurality of longitudinally movable friction plates intercalated with said rigid plates and adapted to be engaged and actuated by said intermediate followers, and a wedging device interposed between said intermediate followers operable in either direction to increase the pressure on said plates upon actuation of said intermediate followers, the over-all length of said wedging device being slightly greater than the length of the movable friction plates.

4. In a friction shock absorbing mechanism, the combination with tandem arranged springs and followers; of a friction device interposed between the intermediate followers, said friction device including, a stationary casing, a plurality of relatively stationary friction plates retained by said casing, a plurality of relatively movable friction plates intercalated with said stationary plates and adapted to be engaged and actuated by said intermediate followers, and a wedging device interposed between said intermediate followers adjacent the intercalated plates, said wedging device being located nearest the movable plates and operable to increase the pressure on said intercalated plates upon actuation of said intermediate followers, said wedging device comprising two like units oppositely arranged, said units having anti-friction means interposed therebetween and anti-friction means between each unit and corresponding adjacent movable friction plate.

5. In a railway draft rigging, the combination with draft sills having front and rear sets of stop lugs secured thereto; of a stationary casing secured to said sills intermediate said sets of stop lugs; a plurality of relatively stationary friction plates retained by said casing; a plurality of relatively movable friction plates alternated with said stationary plates, said stationary and movable plates being arranged in two groups, one on either side of the center line of the mechanism with a movable plate of ach group arranged innermost, said movable plates being of greater length than the dimension of said casing parallel to the center line of the mechanism; a wedging device interposed between said two groups of plates, said wedging device having anti-friction means on each side thereof engageable with the corresponding adjacent inner movable friction plate, said anti-friction means being supported and carried by a holding means forming a part of the wedging device and movable therewith and the normal over-all length of said wedging device being slightly greater than the length of said movable plates; a follower at each end of said wedging device and normally in engagement therewith; a main end follower in engagement with each set of stop lugs; and a spring resistance interposed between each end main follower and adjacent intermediate follower.

6. In a railway draft rigging, the combination of draft sills having front and rear sets of stop lugs secured thereto; of a stationary casing secured to said sills intermediate said sets of stop lugs; a plurality of stationary plates carried by said casing; a plurality of relatively movable friction plates alternated with said stationary plates, said stationary and movable plates being arranged in two groups, one on either side of the center line of the mechanism, said movable plates being of greater length than the dimensions of said casing parallel to the center line of the mechanism; a wedging device interposed between said two groups of interposed plates, said wedging device being expansible laterally and having anti-friction means on each side thereof, engageable with the corresponding adjacent friction plates, said anti-friction means being so mounted as to have lateral movement in the direction of the expansion of the wedging device and the normal over-all length of said wedging device being slightly greater than the length of said movable plates; a follower at each end of said wedging device and normally in engagement therewith; a main end follower in engagement with each set of stop lugs; and a spring resistance interposed between each end main follower and adjacent intermediate follower.

In witness that I claim the foregoing I have hereunto subscribed my name this 30th day of Dec., 1920.

WILLIAM A. GEIGER.

Witnesses:
CARRIE GAILING,
UNA C. PERIN.